United States Patent Office 2,858,696
Patented Nov. 4, 1958

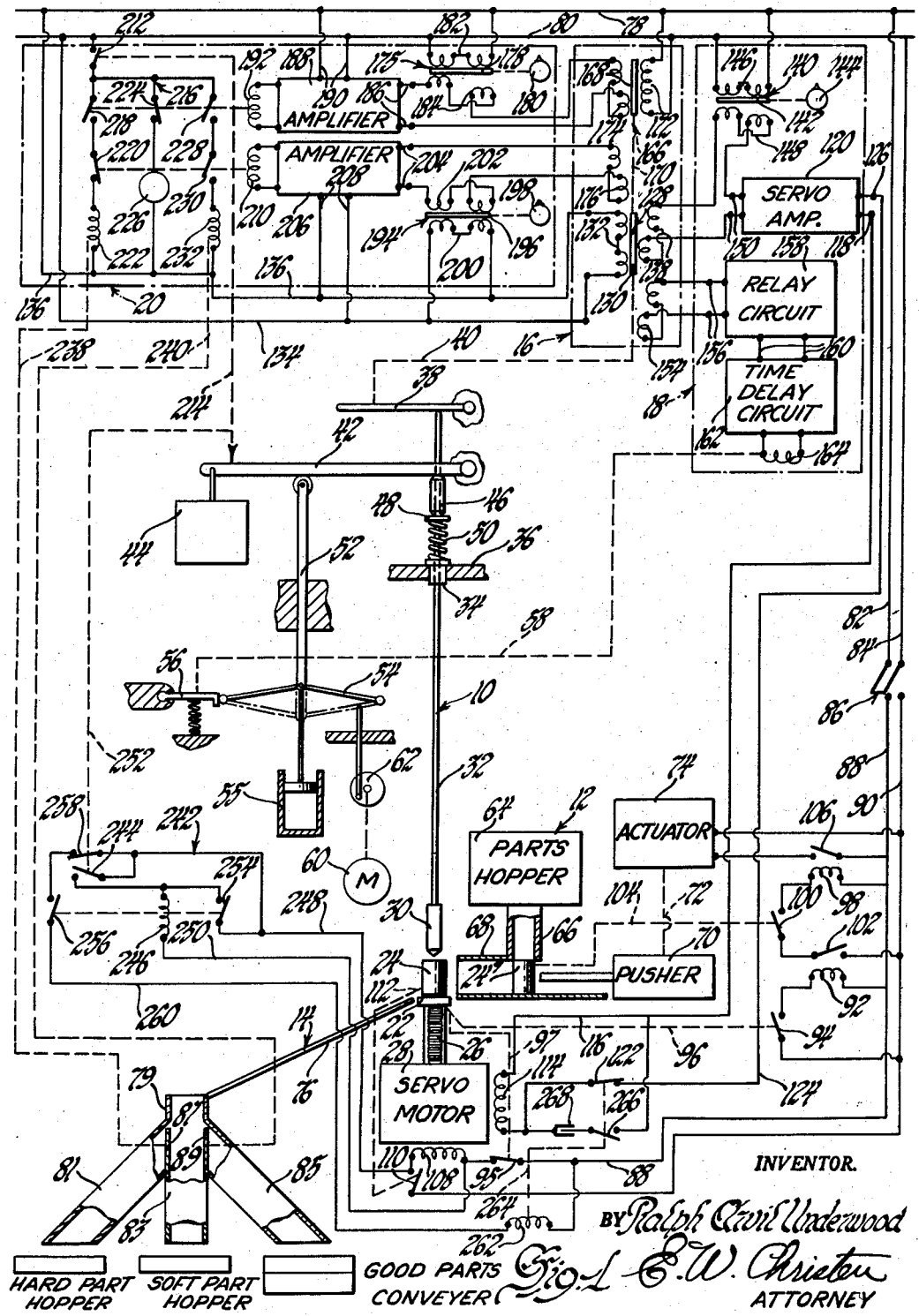

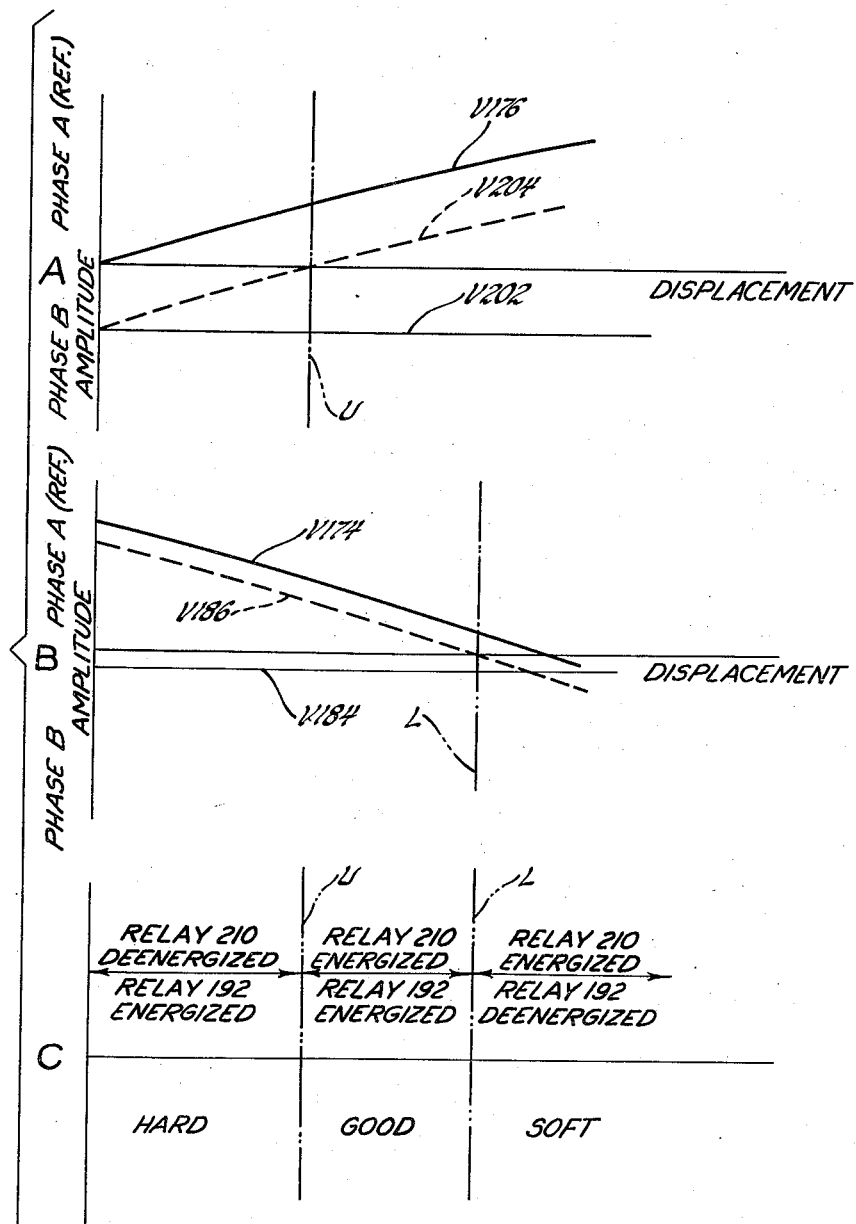

2,858,696

HARDNESS TESTING APPARATUS

Ralph A. Underwood, Stanwood, Mich., assignor to General Motors Corporation, Detroit, Mich., a corporation of Delaware Application January 13, 1956, Serial No. 558,881

11 Claims. (Cl. 73—83)

This invention relates to testing apparatus of the type in which the displacement of a penetration element is measured to ascertain a property of a workpiece; more particularly, it relates to hardness testing apparatus in which the displacement of an indentor, under controlled load conditions, is taken as an index of hardness of a specimen.

In numerous measuring techniques, it is desirable to control and measure the displacement of an instrument as an index of a quality of a specimen. A prime example is the hardness testing of metal parts such as the well known Rockwell method of hardness testing in which the depth of penetration of an indentor under certain arbitrary test conditions is determined. A minor load is first applied to cause initial peneration and seating of the indentor in the specimen. A major load is then applied under controlled conditions and the depth of penetration caused by the major load is taken as an index of the hardness of the specimen. Various combinations of indentor and major load are employed. Commonly used is the Rockwell "C" scale in which the indentor takes the form of a spherical tipped diamond, called a brale.

In effecting hardness measurements, great precision is required in sensing the penetration of the indentor and in the production testing of parts, it is frequently desired to classify the parts with respect to a predetermined acceptable range of hardness values. For example, a given part having a hardness index falling within the range of Rockwell C–57 to Rockwell C–61 may be classified as acceptable, while parts with a lower hardness index are classified as soft, and those with a higher index are classified as hard. A unit in the Rockwell C scale corresponds to a displacement of eighty millionths of an inch. For an acceptable range of five points Rockwell C, the total variation permissible in the penetration of the indentor must not exceed four ten-thoustandths of an inch. The application of the minor load should be held within a tolerance of plus or minus one-half point Rockwell C which is equivalent to only forty millionths of an inch.

It is an object of this invention to provide an improved hardness testing apparatus which is adapted to provide a precisely controlled minor load application and a precise measurement of penetration upon the application of a major load.

A further object of the invention is to provide an automatic hardness testing apparatus which is adapted for a high rate of production testing and for automatically classifying and sorting the tested parts.

An additional object of the invention is to provide an improved electrical displacement measuring device adapted to provide a null signal voltage response at either limit of the acceptable range of penetration or hardness.

An additional object of the invention is to provide an improved measuring and control circuit adapted to provide a unique response when the measured value falls within an acceptable range, the upper or lower limit of which may be varied at will by the operator.

An additional object of the invention is to provide an improved control circuit for actuating a sorting mechanism.

In the accomplishment of these objects there is provided a servo-mechanism for displacing the specimen into engagement with the indentor and a displacement converter actuated by the indentor to provide the input or error signal to the servomechanism. Upon completion of the minor load application, as sensed by the displacement converter, the major load is automatically applied and a displacement converter develops first and second output signal voltages indicative of the penetration. Each converted output signal voltage is compared in amplitude with a reference voltage of pre-set value by combining the voltages in an opposing sense to obtain a phase reversal of the resultant signal voltage upon the occurrence of null balance. The resultant signal voltage is applied to a phase responsive circuit to control energization thereof upon the occurrence of phase change. A sorting circuit including control relays is effective to actuate sorting apparatus for the parts under test.

A more complete understanding of the invention may be had from the detailed description which follows taken with the accompanying drawings in which:

Figure 1 is a diagrammatic illustration of the inventive apparatus.

Figure 2 is a graphical representation of the operation of the apparatus.

Referring now to the drawings there is shown an illustrative embodiment of the invention in hardness testing apparatus which provides for completely automatic operation including sorting of the parts in accordance with the hardness index. In general, the apparatus comprises a penetration or indentor displacement mechanism, designated generally at 10, with which is associated an automatic loading device 12 for the parts to be tested, and an automatic sorting device 14 for the tested parts. A displacement sensing or gauging device 16 provides an electrical control signal for the load application control circuit 18 and for the measuring or classifying control circuit 20 which in turn controls actuation of the sorting device 14.

The penetration mechanism 10 is suitably of the type employed in the conventional Rockwell hardness testing machine and comprises a support or anvil member 22 adapted to receive a part 24 for testing. The anvil 22 is mounted upon an elevating screw 26 driven by a servomotor 28 which will be described in greater detail subsequently. In axial alignment with the anvil 22 is disposed the indentor or brale mechanism 30 which depends from the indentor shaft 32. The shaft 32 extends through a bushing 34 which is disposed in a fixed support member 36 of the machine. The upper end of the shaft 32 engages a lever 38 pivotally supported on the machine and connected by a linkage 40 to the gauge device 16 which operates to sense indentor displacement in a manner which will be described presently. A major load is applied through the shaft 32 to the indentor 30 by a major load arm 42 pivotally supported at one end on the machine and carrying the major load weight 44 at the other end. The lever 42 is adapted to apply a downward force to the shaft 32 through a link 46 and a collar 48. A coil spring 50 is disposed between the collar 48 and the bushing 34. The major load arm 42 is releasably supported by a vertically reciprocable plunger 52 which is supported at its lower end by a toggle mechanism 54. An extension of the plunger 52 is connected with a dashpot 55 for controlling the rate of descent of the load arm 42. The toggle mechanism 54 is locked in one over-center position by a latch mechanism 56 which is adapted for actuation through a linkage 58 by a relay 164 in the load application control circuit 18 which will be described subsequently. Elevation of the major load arm 42 is effected by a drive motor 60 connected therewith through an elevating mechanism 62, such as an eccentric driven push rod, connected with the toggle mechanism 54. The drive motor 60 is energized under the control of a limit switch (not shown) to return the toggle mechanism to the upper over-center position following each application of the major load, in a well known manner.

The automatic loading device 12 comprises a parts bin or hopper 64 which opens through a gravity chute 66 into a horizontal guide 68 for delivery of parts, one at a time, to the anvil 22. A pusher rod 70 adapted for reciprocating motion within the guide 68 is aligned with the part therein and is periodically displaced, through a linkage 72, by an actuator 74. The actuator 74 may be hydraulic or pneumatic and is preferably provided with an electrical device for controlling the energization thereof.

The automatic sorting device 14 comprises a slide or chute 76 extending from the anvil 22 to the entrance of a sorting mechanism 79. The sorting mechanism 79 includes three chutes 81, 83, and 85, which may be opened or closed selectively by a pair of gates 87 and 89. Actuation of the gates is controlled by the classifying circuit 20 which will be described subsequently.

In order to provide for sequential operation of the apparatus just described, there is provided an electrical control system energized from the alternating current supply lines 78 and 80. A branch circuit including conductors 82 and 84 is connected through the double pole switch 86 to the conductors 88 and 90. A control circuit including the serially connected coil of relay 92 and limit switch 94 is connected across the conductors 88 and 90 for energization therefrom. The limit switch 94 is normally open and is actuated to a closed position through linkage 96 when the elevating screw 26 is in the retracted or lower position. Another control circuit including the serially connected coil or relay 98, limit switch 100, and normally open relay switch 102, is connected across the conductors 88 and 90. The relay switch 102 is closed by energization of the relay 92. The limit switch 100 is normally open and is actuated to the closed position, through linkage 104, by a part 24' in the guide 68. The actuator 74, adapted for electrical control, is energized upon closure of the relay switch 106 which is actuated by the relay 98.

To provide for application of minor load, in effecting the hardness test, the servomotor 28 is energized to elevate the anvil 22 to cause engagement of the part 24 with the indentor 30. The servomotor 28 is suitably a reversible two-phase electrical motor which drives the elevating screw 26 through a reduction gear train, not shown. The servomotor is provided with a fixed or reference phase winding 108, one terminal of which is connected by switch 95 to line 88 and the other terminal of which is connectible through limit switch 110 with the line 90. The limit switch 110 is normally open and is actuated to the closed position, through linkage 112, by the presence of the part 24 on the anvil 22. The servomotor 28 also includes a phase winding 114 having one terminal connected through line 116 to the output terminal 118 of the servo amplifier 120 in the load application control circuit 18. The other terminal of the phase winding 114 is connected through a relay actuated switch 122 and line 124 to the other output terminal 126 of the aforementioned servo amplifier. Thus, the servomotor 28 is energized for application of the minor load in accordance with the output voltage of the servo amplifier 120.

The control of the minor load application by servomotor 28 is effected by the displacement sensing device 16 which includes a displacement converter or differential transformer 128. The differential transformer comprises a movable core 130 which is connected to linkage 40 for actuation thereby in accordance with the displacement of the indentor 30 and shaft 32. The differential transformer 128 is provided with a primary winding 132, the terminals of which are connected across the supply lines 78 and 80 through branch conductors 134 and 136. The transformer 128 includes a secondary winding 138 which develops an output voltage which is proportional in amplitude and which corresponds in phase to the extent and direction of displacement of the core 130 from a reference position. To permit adjustment of the value of minor load, there is provided a differential transformer 140 having a movable core 142 which may be adjustably positioned by a manually actuated knob 144. The transformer 140 has a primary winding 146 connected across the supply lines 78 and 80. A secondary winding 148 of the transformer 140 is serially connected with the secondary winding 138 of transformer 128 across the input terminals 150 of the servo amplifier 120. Accordingly, the servo amplifier and the servomotor are energized in accordance with the algebraic sum of the secondary or output voltages of the differential transformers 128 and 140. Thus, the servomechanism loop is completed and the system operates in a well known manner to reduce the input voltage across terminals 150 to a null value by energization of the servomotor 28 and displacement of the indentor 30, and hence movable core 130, until the voltage output from secondary winding 138 is equal and opposite to the voltage output of secondary winding 148.

Automatic application of the major load upon the establishment of the minor load is also effected by the load application control circuit 18. The differential transformer 128 is provided with an additional secondary winding 154 connected across the input terminals 156 of the relay circuit 158. The relay circuit 158 is connected by conductors 160 to the time delay circuit 162. The time delay circuit is adapted to energize the relay coil 164 at the expiration of a predetermined time interval after energization of the relay circuit 158. The relay 164 is connected through linkage 58 to the latch 56 for actuation thereof to release the toggle mechanism 54 permitting application of the major load.

Upon application of the major load, the penetration of the indentor 30, as indicated by displacement of shaft 32, is measured by the displacement sensing device 16 which includes an additional displacement converter or differential transformer 166. This transformer includes a movable core 168 connected by linkage 170 to the core 130 and thence to linkage 40 for movement therewith. The transformer 166 has a primary winding 172 connected across the supply lines 78 and 80 and a pair of differentially connected secondary windings 174 and 176. The movable core 168 is located in a reference position following application of the minor load and displacement therefrom causes the voltage output of one of the secondary windings to increase and that of the other to decrease. To permit adjustment of the lower limit of the acceptable range of penetration or hardness there is provided a differential transformer 175 having a movable core 178 which may be adjustably positioned by a manual control knob 180. The transformer 175 has a primary winding 182 connected across the supply lines 78 and 80. The secondary winding 184 is serially connected with the secondary winding 174 across the input terminals 186 of the phase responsive amplifier 188. The phase responsive amplifier is energized with a reference phase voltage by connection with the supply lines 78 and 80 through conductors 190. Across the output terminals of the phase responsive amplifier 188 is connected the coil of relay 192.

To permit adjustment of the upper limit of the acceptable hardness range, there is provided a differential transformer 194 having a movable core 196 which may be adjustably positioned by a manual control knob 198. The transformer 194 has a primary winding 200 which is connected across the supply lines 78 and 80 through conductors 134 and 136. The secondary winding 202 of transformer 194 is serially connected with the secondary winding 176 across the input terminals 204 of phase responsive amplifier 206. The phase responsive amplifier is energized with a reference phase voltage through conductors 208 which are connected across conductors 134 and 136. The energizing coil of relay 210 is connected across the output terminals of the phase responsive amplifier 206.

To provide for actuation of the sorting mechanism 14 in accordance with the measured value of penetration derived by the measuring circuit 20, a control circuit designated generally at 216, is connected across the supply lines 78 and 80 through conductor 136 and limit switch 212. The limit switch 212 is normally open and is actuated to the closed position by the linkage 214 when the major load arm 42 is in the down position. The control circuit, comprises plural branch circuits, the first of which comprises in series connection the normally open relay switch 218, normally closed relay switch 220, and relay coil 222. Another of the branch circuits includes the normally closed relay switch 224 and the indicator lamp 226. The other branch circuit includes the normally open relay switch 228, the normally open relay switch 230, and relay coil 232. The switches 218, 224, and 228 are mechanically ganged for actuation by the armature of the relay 192. The switches 220 and 230 are mechanically ganged for actuation by the armature of the relay 210. The armature of relay coil 222 is connected through linkage 238 to the gate 87 of the sorting mechanism 79. The armature of the relay coil 232 is connected through the mechanical linkage 240 to the gate 89 of the sorting mechanism 79.

Following the application of the major load, it is necessary to cause retraction or lowering of the anvil 22 by reversal of the servomotor 28. This is accomplished by the control circuit designated generally at 242. This control circuit includes the series connection of limit switch 244 and the energizing coil of relay 246 across the servomotor winding 108 through the conductors 248 and 250. The limit switch 244 is normally open and is actuated to the closed position through the linkage 252 by the major load arm 42 when it is in the lower position. The relay 246, when energized, actuates the relay switch 254 to the closed position to establish a holding circuit for the coil of relay 246 through conductors 248 and 250. The relay 246 also actuates the relay switch 256 to the closed position which completes a circuit from conductor 248 through limit switch 258, relay switch 256, conductor 260, and energizing coil of relay 262 to the line 88. The limit switch 258 is actuated through the linkage 252 by the major load arm 42 and is closed when the arm is in the upper position. Thus an energizing circuit for relay 262 is completed. The armature of relay 262 is connected through linkage 264 to a limit switch 266 and the limit switch 122. The limit switch 266 is connected in circuit with capacitor 268 across the terminals of the servomotor winding 114. When relay 262 is energized, limit switch 266 is closed and limit switch 122 is opened resulting in disconnection of servomotor winding 114 from the servo amplifier 120. The servomotor is thus operable as a single phase shaded pole motor energized by the winding 108. The servomotor 28 is reversed to retract the anvil 22 to the lower position in which the limit switch 95, in circuit with winding 108, is opened momentarily by the linkage 97. As a result, relay 246 is de-energized causing switch 256 to be opened which de-energizes relay 262. This restores the relay switches 122 and 266 to the condition shown in the drawings.

The operation of the apparatus will be readily understood from consideration of a complete operating cycle with reference to Figures 1 and 2 of the drawings. To initiate operation, the line switch 86 is closed energizing the lines 88 and 90. With the anvil 22 in the retracted position, limit switch 84 is closed and relay 92 is energized. This closes relay switch 102 and the presence of the part 24' in guide 68 closes limit switch 100. Thus relay 98 is energized and relay switch 106 is closed causing energization of the actuator 74. The pusher 70 is actuated to position the part 24' on the anvil 22 and to displace the part 24 into the chute 76. With the part 24' positioned on the anvil, limit switch 110 is closed and the servomotor winding 108 is energized. The servomotor winding 114 is connected through limit switch 122 and conductors 124 and 116 across the output terminals 126 and 118 of servo amplifier 120 for energization thereby.

The input or error signal voltage applied to the input terminals 150 of servo amplifier 120 depends upon the positional disagreement between the core 130 of transformer 128 and the core 142 of transformer 140. This positional disagreement results in a difference in amplitude of the voltages of secondary windings 138 and 148 and the resultant is applied to the input terminals 150. Consequently, the servomotor 28 is energized by servo amplifier 120 to elevate the part under test into engagement with the brale 30 until the core 130 is displaced sufficiently to reduce the resultant voltage across terminals 150 to a null value at which the minor load is established. The value of the minor load may be predetermined by adjustment of the core 142 by manual control knob 144. This establishes the initial positional disagreement between the transformer cores 130 and 140 and thereby determines the elevation required for anvil 22 to achieve a null balance in the servo system.

Upon a predetermined displacement of the transformer core 130, the voltage induced in secondary winding 154 is decreased sufficiently to permit energization of relay circuit 158 which is suitably of the type employing a thyratron. The relay circuit 158 energizes the time delay circuit 162 which is effective after a given time interval to energize relay 164. Relay 164 actuates the latch mechanism 56 permitting the toggle mechanism 54 to drop the major load arm 42. The major load arm 42, under the influence of weight 44, descends at a controlled rate determined by dashpot 55. The shaft 32 is displaced downwardly causing penetration of the part by the indentor 30 and a corresponding displacement of the movable cores of transformers 166 and 128 an amount which is indicative of the hardness of the specimen.

For purposes of explanation of the operation of the measuring circuit 20, it will be assumed that downward displacement of the transformer core 168 causes the voltage amplitude in secondary winding 176 to increase and the voltage amplitude in secondary winding 174 to decrease from the reference value established by application of the minor load. As the description proceeds, it will be apparent that this relationship may be reversed or that other relations may be employed and that the particular description is intended to be illustrative only. In Figure 2A the voltage developed by transformer secondary winding 176, designated at $v176$, increases linearly as a function of displacement of the core 168. It is noted that in this graphical representation, amplitude values above the abscissa or displacement axis are designated as phase A, which may be considered the reference phase, for explanatory purposes. Amplitude values below the displacement axis are of the opposite phase or phase B. The voltage amplitude developed in secondary winding 202, designated at $v202$, is of phase B. The amplitude of $v202$ may be adjusted to any desired value by manipulation of the control knob 198 and is invariable with displacement. The algebraic sum of $v176$ and $v202$, designated at $v204$, will be of zero or null value at a given value of displacement U, since $v176$ and $v202$ are of opposite phase. The value of displacement which produces the null value of $v204$ is predetermined by the adjustment of control knob 198 and establishes the upper limit of the acceptable range of hardness values in a manner to be described presently. As the displacement of the core 168 increases, the voltage $v204$ passes through the null point U and a change of phase occurs from phase B to phase A. In Figure 2B, the voltage output of transformer secondary winding 174, designated at v174, decreases linearly as a function of displacement of the core 168. The voltage developed in transformer secondary winding 184, designated at v184, is of phase B and of an amplitude determined by the setting control knob 180. The algebraic sum of voltages v174 and v184, designated at v186, is of zero or null value at a value of displacement L. The value of displacement L which produces the null value of v186 may be predetermined by adjustment of the control knob 180 and establishes the lower limit of the acceptable hardness range in a manner to be described presently.

When, upon application of the major load, the penetration or displacement of the indentor 30, and the corresponding displacement of the core 168, is less than the value U, the resultant voltage v204 is of phase B. This voltage is applied to the input terminals 204 of the phase responsive amplifier 206 and since the input voltage is opposite in phase to the reference phase A, the amplifier is non-responsive and relay 210 is not energized. Accordingly, relay switch 230 remains open. Under the same conditions, the resultant voltage v186 is of phase A, the reference phase, and is applied to the input terminals 186 of the phase responsive amplifier 188. The amplifier 188 and relay 192 are therefore energized and the relay switch 228 is closed and relay switch 218 is closed. The closing of relay switch 218 permits energization of relay winding 222 from conductors 78 and 80 through limit switch 212, which is closed by the major load arm in the lower position, and through switches 218 and 220. The part is classified as hard by the measuring circuit 20 and energization of relay coil 222 causes actuation of the gate 87 in the sorting mechanism 79 to divert the part into chute 81.

If displacement of the core 168 is greater than the value U, but less than the value L, the voltage v204 applied to the input terminals 204 of phase responsive amplifier 206 is of the reference phase A and, accordingly, the relay coil 210 is energized. This causes the relay switch 220 to be opened and the relay switch 230 to be closed. Under the same condition, the voltage v186 is also of the reference phase A and accordingly the phase responsive amplifier 188 and relay 192 are energized. This causes the relay switches 218 and 228 to be closed and the relay switch 224 to be opened. In this condition, relay coil 232 is energized and the gate 89 is actuated and is effective to guide the part into the good parts conveyer.

If the displacement of core 168 is greater than the value L, the voltage v204 is of the reference phase A and accordingly, the phase responsive amplifier 206 and relay 210 are energized. This causes the relay switch 230 to be closed and the relay switch 220 to be opened. Under the same conditions the voltage v186 is of phase B, or opposite the reference phase A, and therefore the phase responsive amplifier 188 and relay 192 are de-energized. Accordingly, the relay switches 218 and 228 are opened and the relay switch 224 is closed. The relay switch 224 completes a circuit for the signal lamp 226 which signifies that the tested part is too soft and does not fall within the acceptable range of hardness values. Since both relay switches 218 and 228 are open, neither of the relay coils 222 and 232 are energized and the gates 87 and 89 remain in the positions shown to guide the part into the soft part hopper. It will be appreciated that the measuring circuit 20 operates substantially instantaneously to classify the tested part immediately following the application of the major load. The operation of the gates 87 and 89, in accordance with the response of the measuring circuit 20, occurs immediately upon closing of limit switch 212 when the major load arm 42 is returned to its upper position. The return of major load arm to its upper position also initiates reversal of the servomotor 28 by closing the limit switch 258. The servomotor 28 is operated as a single phase motor in the manner described previously to return the anvil 22 to its retracted or lower position. With the anvil in the lower position, the pusher 70 is actuated to displace the tested part into the sorting mechanism 79 where it is guided into the appropriate chute by the gates 87 and 89, which are positioned in accordance with the condition of the measuring circuit 20 for that particular part. At the same time a new part is positioned on the anvil 22 in readiness for the hardness test, and the succeeding cycle of operation is initiated.

It will now be appreciated that the range of acceptable hardness values may be established readily by adjustment of either the upper or lower limits. As illustrated in Figure 2C, the acceptable or good range, is delimited by the displacement values U and L. The value U is dependent upon the position of movable core 196 and may be adjusted by simple manipulation of control knob 198. Similarly, the value L is dependent upon the position of core 178 and may be adjusted by control knob 180. The condition of the relays 210 and 192 corresponding to the different classifications is also illustrated in Figure 2C.

Although the description of this invention has been given with respect to a particular embodiment, it is not to be construed in a limiting sense upon the scope of the invention. Many modifications and variations within the spirit and scope of the invention will now occur to those skilled in the art. For a definition of the invention, reference is made to the appended claims.

What is claimed is:

1. Testing apparatus comprising a test element, means for displacing the test element, an electrical displacement converter operatively connected with the test element and having an output circuit for developing a signal voltage having an amplitude indicative of the amount of displacement of the test element, electrical means for developing a reference voltage of predetermined fixed amplitude, circuit means interconnecting the output circuit and the electrical means for combining the signal voltage and reference voltage in an opposing sense to derive a resultant voltage, a null voltage detector responsive to the resultant voltage and connected with the circuit means, and relay means connected with the detector adapted to respond upon the occurrence of null resultant voltage to signify displacement of the test element and signal voltage amplitude corresponding to the predetermined value of the reference voltage.

2. Testing apparatus comprising a displaceable test element, an electrical displacement converter operatively connected with the test element and having an output circuit for developing an alternating signal voltage having an amplitude indicative of the amount of displacement of the test element, electrical means for developing an alternating reference voltage of predetermined fixed amplitude, circuit means interconnecting the output circuit and the electrical means for combining the signal voltage and reference voltage in phase opposition to derive a resultant voltage, and phase responsive relay means connected with the circuit means for signifying the correspondence of the displacement of the test element to the amplitude of the reference voltage upon the occurrence of phase reversal of the resultant voltage.

3. Testing apparatus for ascertaining whether a property of a workpiece falls within, above, or below a predetermined range of values comprising a test element, means for displacing the test element an amount indicative of the value of said property, an electrical displacement converter operatively connected with the test element and having first and second output circuits adapted to develop first and second signal voltages which are related by different functions to the displacement of the test element, first and second electrical means for developing first and second fixed reference voltages for establishing the upper and lower limits of said range of values, first and second circuit means interconnecting respectively the first and second electrical means and the first and second output circuits for combining the voltages in an opposing sense to obtain first and second resultant voltages, first and second null voltage detectors connected respectively to the first and second circuit means, first and second relay means connected respectively with the first and second null voltage detectors, and means connected with the first and second relay means responsive to actuation of one relay to signify a first value of said property and responsive to actuation of both relays to signify a second value of said property.

4. Testing apparatus for ascertaining whether a property of a workpiece falls within, above, or below a predetermined range of values comprising a test element, means for displacing the test element an amount indicative of the value of said property, an electrical displacement converter operatively connected with the test element, first and second control voltage channels each of which includes an output circuit of the displacement converter for developing a signal voltage indicative of the displacement of the test element, electrical means in each of said channels for developing a fixed reference voltage in opposed relation to the signal voltage to derive a control voltage, a null voltage detector and relay means in each of said channels and responsive to said control voltage for signifying the correspondence of the displacement of the test element to the amplitude of the reference voltage upon the occurrence of null control voltage, and means for adjusting the reference voltages to predetermined different values whereby the null control voltages in the first and second channels occur at different values of displacement.

5. Testing apparatus for ascertaining whether a property of a workpiece falls within, above, or below a predetermined range of values comprising a test element, means for displacing the test element an amount indicative of the value of said property, a first variable inductive coupling device having a movable member operatively connected with the test element and a pair of output windings for developing first and second signal voltages corresponding in amplitude to the displacement of the test element, a first displacement measuring circuit including one of said output windings and a fixed reference voltage source connected in phase opposition across the input terminals of a first phase responsive circuit, first relay means connected for energization to the first phase responsive circuit, a second displacement measuring circuit including the other of said output windings and a fixed reference voltage source connected in phase opposition across the input terminals of a second phase responsive circuit, second relay means connected for energization to the second phase responsive circuit, and means connected with the first and second relay means responsive to actuation of one relay to signify a first value of said property and responsive to actuation of both relays to signify a second value of said property.

6. Automatic hardness testing apparatus comprising an indentor, means for loading the indentor to cause displacement thereof in accordance with the hardness of a specimen, a first transformer having a movable core operatively connected with the indentor, a second transformer having a manually positionable movable core disposed in a fixed position corresponding to a unique position of the movable core of the first transformer, the secondary windings of said transformers being serially connected in phase opposition to develop a resultant voltage subject to phase reversal upon displacement of the movable core of the first transformer to said unique position, a phase responsive amplifier having an input circuit connected across the serially connected secondary windings for energization thereby, and relay means connected for energization to the output circuit of the amplifier.

7. Automatic hardness testing apparatus comprising an indentor, means for loading the indentor to cause displacement thereof in accordance with the hardness of a specimen, a displacement sensing differential transformer having a movable core operatively connected with the indentor, said differential transformer having a pair of secondary windings, a pair of displacement measuring circuits each including one of said secondary windings and a secondary winding of a reference voltage differential transformer, a phase responsive amplifier connected across each of said measuring circuits, and relay means connected for energization to each of said amplifiers, each of said reference voltage differential transformers having a movable core whereby the displacement of said indentor causing phase reversal in each of said measuring circuits and energization of the relay means may be established at predetermined different values.

8. Automatic hardness testing and sorting apparatus comprising an indentor, means for loading the indentor to cause displacement thereof corresponding to the hardness of a specimen, a displacement converter operatively connected with the indentor, first and second displacement measuring circuits energized by the converter, normally de-energized relay means connected with the first measuring circuit for energization thereby when the displacement exceeds a first predetermined value, normally energized relay means connected with the second measuring circuit for de-energization when the displacement exceeds a second predetermined value, sorting means connected with each of the relay means for actuation, whereby one of the sorting means is actuated when the displacement is less than the first predetermined value and the other is actuated when the displacement is greater than the second predetermined value.

9. Automatic hardness testing and sorting apparatus comprising an indentor, means for loading the indentor to cause displacement thereof corresponding to the hardness of a specimen, a displacement converter operatively connected with the indentor, first and second displacement measuring circuits energized by the converter, normally de-energized relay means connected with the first measuring circuit for energization thereby when the displacement exceeds a first predetermined value, normally energized relay means connected with the second measuring circuit for de-energization thereby when the displacement exceeds a second predetermined value, a control circuit including a pair of parallel circuits each having a relay winding and first and second switches in series, said first switches being in opposite switching conditions and connected for actuation to the normally de-energized relay means, said second switches being in like switching conditions and connected for actuation to the normally energized relay means, and a sorting device actuated by each of said relay windings.

10. Automatic hardness testing apparatus comprising a displaceable indentor and a movable member adapted to support a specimen, a closed loop servomechanism for applying a minor load to the indentor including a servomotor connected to the movable member for displacement thereof toward the indentor, a servo amplifier connected with the servomotor for energization thereof, an electrical displacement converter actuated by the indentor, the input circuit of said amplifier including the output circuit of the converter and a variable amplitude reference voltage source for differentially combining the converter output voltage and the reference voltage, whereby the value of the minor load may be predetermined by adjustment of the voltage amplitude of the reference voltage source.

11. Automatic hardness testing apparatus comprising a movable support member adapted to receive a part for test, a displaceable indentor, a servomechanism for applying a minor load to the indentor including a servomotor operatively connected for displacing the support member toward the indentor, a servo amplifier having an output circuit connected with the servomotor for energization thereof, and a first displacement converter operatively connected with the indentor and with the input circuit of the servo amplifier whereby the servomotor is energized to reduce the signal voltage in the input circuit to null value, relay means responsive to null value in the input circuit for applying a major load to the indentor, a second displacement converter operatively connected with the indentor and having first and second signal voltage output circuits, a reference voltage source connected in each output circuit in opposition to the signal voltage, a first null detector having an input circuit connected across the first output circuit, relay means connected to the first null detector for operation thereby upon the occurence of null resultant voltage in the first output circuit, a second null detector having an input circuit connected across the second output circuit, and relay means connected to the second null detector for operation thereby upon the occurrence of null resultant voltage in the second output circuit.

References Cited in the file of this patent
UNITED STATES PATENTS

| | | |
|---|---|---|
| 2,290,330 | Irwin | July 21, 1942 |
| 2,445,683 | Macgeorge | July 20, 1948 |
| 2,479,072 | Lee | Aug. 16, 1949 |
| 2,554,206 | Pearson et al. | May 22, 1951 |
| 2,564,221 | Hornfeck | Aug. 14, 1951 |
| 2,640,591 | Sieggreen | June 2, 1953 |